United States Patent

[11] 3,542,002

| [72] | Inventor | Cecil W. Miles<br>2819 N. Nicolet Road Rte. 1, Green Bay, Wisconsin 54301 |
|---|---|---|
| [21] | Appl. No. | 821,336 |
| [22] | Filed | May 2, 1969 |
| [45] | Patented | Nov. 24, 1970 |

[54] RECYCLING DEVICE WITH IMPROVED DRAIN VALVE
6 Claims, 4 Drawing Figs.

| [52] | U.S. Cl. | 123/119 |
|---|---|---|
| [51] | Int. Cl. | F02f 9/04 |
| [50] | Field of Search | 123/119B, 119 |

[56] References Cited
UNITED STATES PATENTS

| 1,427,337 | 8/1922 | Tracy | 123/119 |
|---|---|---|---|
| 2,113,447 | 4/1938 | Hardinge | 123/119 |
| 2,244,403 | 6/1941 | Root | 123/119 |
| 2,652,819 | 9/1953 | Nusbaum | 123/119 |
| 3,172,399 | 3/1965 | Lentz et al. | 123/119 |
| 3,450,114 | 6/1969 | Miles | 123/119 |

*Primary Examiner*—Wendell E. Burns
*Attorney*—Andrus, Sceales, Starke & Sawall

ABSTRACT: A recycling device for connection between the sealed crankcase and manifold of an engine includes a pair of opposed sludge drain valves which simultaneously and alternately open and close. When the engine is operating, the upper valve is open to permit sludge to drain therethrough, and the lower valve is closed to trap the sludge between the valves. When the engine is off, the upper valve is closed and the lower valve is opened to permit the trapped sludge to drain therethrough.

Patented Nov. 24, 1970

3,542,002

Inventor
Cecil W. Miles
By
Andrus Sceales, Starke & Sawall
Attorneys

3,542,002

RECYCLING DEVICE WITH IMPROVED DRAIN VALVE

BACKGROUND OF THE INVENTION

This invention relates to an engine vapor recycling device having a drain valve therein.

The invention is an improvement on the structure disclosed in the present inventor's copending U.S. Pat. application Ser. No. 632,038, filed Apr. 19, 1967, now U.S. Pat. No. 3,450,114 entitled ENGINE VAPOR RECYCLING and assigned to a common assignee. In that application, an engine vapor recycling device is connected between the manifold and the sealed crankcase of an internal combustion engine. Condensed-out sludge is removed from the device through flexible one-way valves which are closed when the engine is operating and which are open when the engine is turned off.

SUMMARY OF THE INVENTION

The present invention provides an improved drain action, and utilizes a single two-way valve assembly in the base of the housing for the recycling device. The assembly includes a reservoir or trap for sludge, with opposed valves on the ends of the reservoir. The valves simultaneously and alternately open and close to provide the drain function.

DESCRIPTION OF THE DRAWING

The accompanying drawing illustrates the best mode presently contemplated by the inventor for carrying out the invention.

In the drawing.

DESCRIPTION OF THE PREFERRED EMBODIMENT

Figure 1:
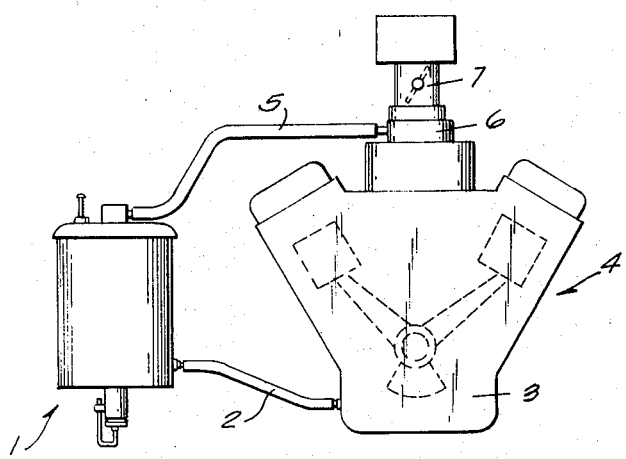
FIG. 1 is a schematic showing of an engine having the vapor recycling device with the improved drain valve connected thereto.

As shown generally in FIG. 1 of the drawing, the invention is embodied in a gas treatment device 1 which is connected through a suitable passage or conduit 2 to the sealed crankcase 3 of a conventional internal combustion engine 4. Similarly, device 1 is connected through a suitable passageway or conduit 5 to the intake manifold 6 of engine 4. A carburetor 7 of any suitable design is mounted adjacent manifold 6.

Device 1 is adapted to receive polluted gases from sealed crankcase 3 through conduit 2, treat them, and then discharge the treated gases through conduit 5 where they return to manifold 6. The details of one form of gas treating device are fully set forth in the above-identified copending application. Suffice it to say here that the device includes engine manifold vacuum responsive valve means 8 (FIG. 2) through which the gases flow and which separate the sludge therefrom.

Figure 2:
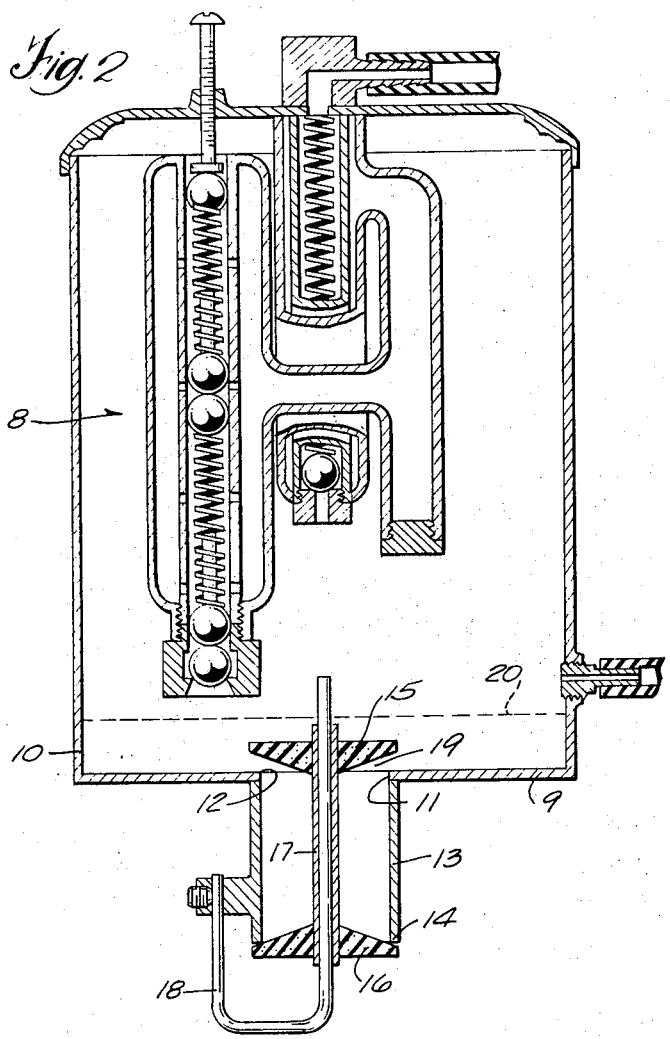
FIG. 2 is a central vertical section of the recycling device shown in FIG. 1, and showing the drain valve in engine operating position.

Engine manifold vacuum responsive valve means other than those shown in FIG. 2 herein and more fully described in said copending application, may be utilized herein without departing from the spirit of the present invention.

In accordance with the present invention, improved means are provided for automatic removal of the sludge which valve means 8 has removed from the engine gases, the sludge having dripped down and collected on the floor 9 of housing 10 which forms a chamber containing and mounting the recycling device. For this purpose, a discharge opening 11 having a circumferential edge 12 is provided in floor 9. Opening 11 provides communication between the housing chamber and a sludge reservoir or trap formed in part by a tubular member 13 secured to floor 9 and extending outwardly and downwardly from the opening. The lower end edge 14 of tube 13 forms, together with edge 12, a pair of spaced oppositely facing fixed valve seats which are adapted to cooperate with movable valve members 15 and 16.

Members 15 and 16 may be made of any suitable material which will seal against their respective seats, and are secured in fixed spaced relationship on a tubular valve mount 17. Mount 17 is disposed generally coaxially within tube 13 and is telescopingly and slideably mounted for free movement on a support rod 18 which is secured at one end to the outer wall of tube 13, and which extends coaxially through the latter into the chamber of housing 10.

Valve mount 17 is longer in extent than tube 13 and than the distance between seats 12 and 14. Likewise, valve members 15 and 16 are spaced apart a distance slightly greater than the longitudinal distance between seats 12 and 14, and are in opposed relationship to form, together with tube 13, the complete sludge trap.

As shown in FIG. 2, when engine 4 is operating so that there is manifold vacuum, the upward force will cause valve member 15 to open by rising into the housing chamber and out of engagement with seat 12, while valve member 16 will simultaneously close by rising into seated engagement with seat 14. The space or opening 19 between upper member 15 and its seat 12 will permit sludge 20 to flow down therethrough into tube 13. However, the sludge will be trapped in the tube between the valves, since lower member 16 is seated.

Figure 3:
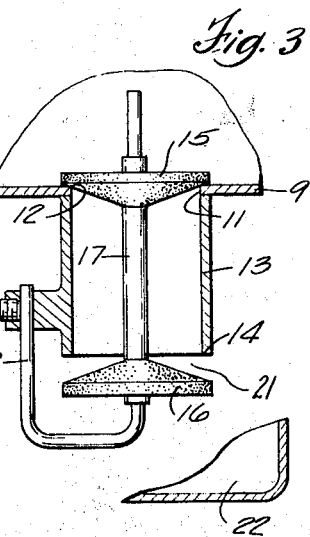
FIG. 3 is a fragmentary section of the drain valve of FIG. 2, and showing the valve in engine-off position.
Figure 4:
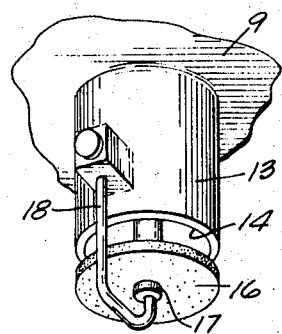
FIG. 4 is a perspective view of the drain valve in the position of FIG. 3.

As shown in FIGS. 3 and 4, when engine 4 is off, there will be no manifold vacuum, and gravity will cause the drain valve assembly to drop so that the upper valve is now closed and the lower valve is open to provide a space 21 through which trapped sludge 20 can drain or escape. A collector pan 22 may be used to receive the drained sludge, if desired.

Various modes of carrying out the invention are contemplated by the inventor.

The following claims particularly point out and distinctly claim the subject matter which is regarded as the invention.

I claim:

1. In an engine vapor recycling device for connection between the crankcase and manifold of an engine and wherein the device includes engine gas treating means mounted in the chamber of a housing, said gas treating means forming sludge which collects on the floor of the housing; automatic sludge drain means comprising:
  a. a sludge trap extending from the floor of the housing and communicating with said chamber;
  b. said sludge trap including dual opposed simultaneously operable valves;
  c. one valve being open when there is manifold vacuum during engine operation to permit drainage of sludge from said chamber into said trap, with said one valve being closed when the engine is off; and
  d. the other valve being closed when there is manifold vacuum during engine operation to prevent discharge of sludge from said trap, with said last-named valve being open when the engine is off to permit sludge drainage from said trap.

2. The engine vapor recycling device of claim 1 wherein said dual simultaneously operable valves comprise:
  a. a pair of spaced seats; and
  b. a pair of opposed valve members fixedly spaced apart a distance slightly greater than the spacing of said seats and mounted for movement into or out of engagement therewith.

3. The engine vapor recycling device of claim 1:
  a. wherein said floor includes an opening having a circumferential edge;
  b. wherein said sludge trap includes a tubular member extending outwardly from said opening and having an end edge; and
  c. said edges forming spaced seats for said valves.

4. The device of claim 3 which includes:
  a. a mount extending axially through said tube;

b. a pair of opposed valve members secured to said mount and fixedly spaced apart a distance slightly greater than the spacing of said seats; and c. said mount being movable axially of said tube to provide alternate engagement or disengagement of said valve members with their respective seats.

5. The device of claim 4 which includes a support rod extending axially through said tube, and wherein said mount is telescopingly mounted for free sliding movement on said rod, the construction being such that engine manifold vacuum moves said mount in one direction and gravity moves said mount in the other direction.

6. The device of claim 5 in which said mount is longer than the space between said seats.

UNITED STATES PATENT OFFICE
CERTIFICATE OF CORRECTION

Patent No. 3,542,002     Dated November 24, 1970

Inventor(s) CECIL W. MILES

It is certified that error appears in the above-identified patent and that said Letters Patent are hereby corrected as shown below:

On Cover Page:
Between code No. [45] and code No. [54] insert

---[73] Assignee: Green Bay Research Corporation,
              Green Bay, Wisconsin---

Signed and sealed this 30th day of March 1971.

(SEAL)
Attest:

EDWARD M. FLETCHER, JR.              WILLIAM E. SCHUYLER,
Attesting Officer                    Commissioner of Patent